UNITED STATES PATENT OFFICE.

ELISHA SMITH, OF ERVING, MASSACHUSETTS.

IMPROVEMENT IN FRICTION-MATCHES.

Specification forming part of Letters Patent No. 3,773, dated October 3, 1844.

*To all whom it may concern:*

Be it known that I, ELISHA SMITH, of Erving, in the county of Franklin and State of Massachusetts, have discovered a new and useful Improvement in the Manufacture of Phosphorous Friction-Matches; and I do hereby declare that the following constitutes a full and exact specification of the same.

It has long been well understood by chemists and those engaged in making phosphoric briquets or match-boxes and phosphoric matches to be fired by friction that the phosphorus, whether combined or not with sulphur or niter, required protection from oxidation and the absorption of moisture. For such purpose magnesia or some other earthy material or materials mixed with the phosphorus or connected to the same by a gelatinous or other suitable matter (which has also been employed to cause the phosphorus and earthy material to adhere to the sulphurized or nitrous extremity of a match) has been employed. That an earthy material has long been used as a protector to phosphorus is found by reference to the specification of the patent of the Sieur Derepas, which patent was obtained in France on the 13th day of June, A. D. 1809, and that earthy materials have been employed as mixed with other inflammable matter or matters which take fire by friction, and connected thereto by a gelatinous or gummy matter, will be seen by reference to the patent granted in France on the 30th March, A. D. 1833, to the Sieur Joseph et Compagnie, of Paris. We therefore find that the use of an inflammable substance to take fire by friction, one or more protective earthy or mineral substances, and an adhesive glutinous cement to stick them together was known and patented so long ago as March 30, 1833. That covering the explosive paste upon the extremity of a friction-match with varnish for the purpose of protecting it from the action of the atmosphere and the effects of friction during transportation of the matches, &c., has been long known and in use will be proved by reference to the patent granted in France on the 5th of August, A. D. 1837, to Madamoiselle Victorine Klug.

The various articles heretofore used for the protection of phosphorus or other inflammable matter from oxygenation or absorption of moisture have been of an earthy or mineral nature, and such as may be considered as incombustible in a very great degree. Their incombustible properties prevent in a serious manner the ready inflammation of the phosphorus and sulphur or niter, so that while they perform their office of protectors of the phosphorus, they operate to retard or prevent the inflammation thereof when the match is rubbed upon any rough surface for the purpose of lighting it.

My improvement consists in the use of pulverized dried vegetable matters as protectors of the inflammable material; and, further, in the use of such vegetable matters as contain tannin, which, when the said vegetable matters are mixed with the glue or gelatinous matter, will form with such gelatinous matter an insoluble substance, termed "tanno-gelatine," which has the property not only of protecting the phosphorus or inflammable matter from the absorption of moisture, but of readily being consumed by fire. The antiseptic property of such materials tends greatly to the preservation of the glutinous or animal matters. In the preparation of my friction-matches I have employed pulverized hemlock-bark; but pulverized oak-bark, dried leaves of various plants, sumac, nut-galls, and many other vegetable substances containing more or less tannin may be substituted.

In matches wherein earthy incombustible matters are used as protectors of the phosphorus a considerable explosion and blowing out of the flame usually takes place on ignition of the phosphorus upon them. Small globules or particles of inflamed phosphorus are thus often ejected or thrown off from the match, which are liable to produce serious accidents—such as setting fire to clothes or burning the eyes or other exposed parts of the person using the match. The using of a woody combustible substance as a protector to the phosphorus or other inflammable materials, and to give body to the mixture of the same with glue, &c., prevents to a very great degree, if not entirely, the said throwing from the match of hot globules or particles, as will be perceived by the ignition of one of my improved matches. The powdered combustible woody substance takes fire and burns with the phosphorus, and aids or facilitates the ignition thereof, while an incombustible earthy material retards or hinders the combustion of the same.

The mastic upon the match, being free from earthy or gritty substances, is not so liable to accidental ignition as that on other matches. There is also less danger of accident attending the manufacture of matches in my improved manner, as the preparation is used at a very low temperature, one far below that at which phosphorus takes fire. The dipping of the matches and covering them with varnish are to be performed according to the modes in general practice.

I do not claim the combining with phosphorus or other inflammable substance an earthy incombustible material mixed with it or made by means of a glutinous substance—such as glue or gum-arabic—to adhere to and surround and protect it from oxidation or the absorption of moisture. Neither do I claim the employment of glue or a gelatinous liquid or substance for the purpose of cementing the phosphorus and protecting material together, because I believe that such earthy and gelatinous materials, whether together or separate from each other, have long been employed both in this and foreign countries for such purposes; but that which I do claim consists in—

1. The employment in the manufacture of friction-matches of combustible materials—such as pulverized dried bark, wood, or other vegetable matters substantially the same in character—instead of mineral and earthy substances for the purpose of protecting the phosphorus or inflammable substance and for giving consistency or body to the paste, as above set forth.

2. The using of vegetable matters—such as hemlock-bark, oak-bark, sumac, nut-galls, &c.—containing more or less tannin, and which, when combined with the glue or gelatinous adhesive mixture, form tanno-gelatine, or an insoluble substance which, although almost, if not entirely proof against the absorption of moisture, will readily be consumed by fire, the whole being substantially as hereinbefore explained.

ELISHA SMITH.

Witnesses:
R. H. EDDY,
WM. H. PLUMMER.